Patented Aug. 21, 1951

2,564,757

UNITED STATES PATENT OFFICE 2,564,757

CORROSION INHIBITOR COMPOSITION

Arthur L. Glasebrook, Wilmington, Del., assignor to Hercules Powder Company, Wilmington, Del., a corporation of Delaware No Drawing. Application June 3, 1950,
Serial No. 166,060

14 Claims. (Cl. 252—392)

This invention relates to corrosion inhibitors and more particularly to corrosion inhibitors for aqueous solutions which normally corrode metals.

Stabilized rosin amines such as hydrogenated rosin amines and dehydrogenated rosin amines are known to have the property of inhibiting corrosion of metal surfaces when applied to the surfaces in an unctuous solvent. Although these stabilized rosin amines and their salts have been found useful in unctuous solvents, they have not been found to be suitable per se as inhibitors of corrosion in aqueous solutions as in mineral acid solutions used in the cleaning of metals. Moreover, the amines themselves have not been satisfactory in neutral or alkaline water.

Now in accordance with this invention, it has been found that aqueous compositions normally corrosive to metal surfaces are inhibited toward corrosion of such metal surfaces when they contain dissolved or dispersed therein in small amounts a composition consisting of 5 to 50% of a primary rosin amine and a complement of a material of the formula $$RO(CH_2CH_2O)_mH$$

having a molecular weight between about 700 and about 2000, where R is a radical selected from the group consisting of abietoyl, hydroabietoyl, and dehydroabietoyl and where $m$ is an integer such that the molecular weight is within the above-designated range. The inhibitor compositions of this invention are particularly effective as inhibitors for mineral acids such as hydrochloric acid used in oil well acidizing and in boiler cleaning. Their effectiveness in inhibiting corrosion of ferrous metals by such mineral acids is much greater weight for weight than the effectiveness of any of the components taken separately. There is thus a synergistic effect in the compositions as shown hereinafter in the examples which illustrate the use of the compositions of this invention.

As examples of the present invention, tests were made on the corrosion of low carbon steel plates in inhibited and in uninhibited 15% hydrochloric acid solutions at 165° F. for four hours. The technique of carrying out the tests was as follows:

To samples of 15% hydrochloric acid were added in an amount of 0.2% by weight of the acid the materials designated in the table. The inhibited acids were then thoroughly stirred at 165° F. to effect complete dispersion of the added inhibitor materials. To each of these solutions was added a weighed freshly polished low carbon steel plate (2 inches square) at 165° F. and the solutions were maintained at that temperature for four hours. The plates were then weighed for weight loss as a measure of corrosion. For comparison, an uninhibited hydrochloric acid solution was also tested. The per cent corrosion is calculated by dividing the per cent weight loss of the plate in the inhibited acid by the per cent weight loss of the plate in the uninhibited acid. The results are recorded in table.

Table

|   | Inhibitor Combination | Mol. Wt. | Per Cent | Per Cent Corrosion Using Inhibitor in Amount of 0.2% |
|---|---|---|---|---|
| 1 | Dehydrogenated rosin amine | 283 | 100 | 2.12 |
| 2 | Polyethylene glycol ester of dehydrogenated rosin | 1,618 | 100 | 22.85 |
| 3 | Polyethylene glycol ester of dehydrogenated rosin | 1,178 | 100 | 22.60 |
| 4 | Polyethylene glycol ester of dehydrogenated rosin | 958 | 100 | 21.88 |
| 5 | Polyethylene glycol ester of dehydrogenated rosin | 738 | 100 | 20.95 |
| 6 | Polyethylene glycol ester of N-wood rosin | 960 | 100 | 21.95 |
| 7 | {Compound 1 / Compound 2} | 283 / 1,618 | 15 / 85 | 0.82 |
| 8 | {Compound 1 / Compound 3} | 283 / 1,178 | 15 / 85 | 0.91 |
| 9 | {Compound 1 / Compound 3} | 283 / 1,178 | 10 / 90 | 1.52 |
| 10 | {Compound 1 / Compound 3} | 283 / 1,178 | 5 / 95 | 4.37 |
| 11 | {Compound 1 / Compound 4} | 283 / 958 | 15 / 85 | 1.01 |
| 12 | {Compound 1 / Compound 4} | 283 / 958 | 10 / 90 | 1.69 |
| 13 | {Compound 1 / Compound 4} | 283 / 958 | 5 / 95 | 4.08 |
| 14 | {Compound 1 / Compound 5} | 283 / 738 | 15 / 85 | 0.94 |
| 15 | {Compound 1 / Compound 6} | 283 / 960 | 15 / 85 | 1.16 |
| 16 | {Compound 1 / Compound 6} | 283 / 960 | 10 / 90 | 1.38 |
| 17 | {Compound 1 / Compound 6} | 283 / 960 | 5 / 95 | 3.21 |

Similar tests have shown that there is a synergistic effect in the inhibitor properties of ordinary rosin amine rich in abietylamine and hydrogenated rosin amine containing both dihydroabietylamine and tetrahydroabietylamine when used in combination with monoesters of polyethylene glycols and rosin acids, hydrogenated rosin acids or dehydrogenated rosin acids wherein the molecular weight of the ester is at least about 700 and within the range of about 700 to 2000. This synergistic effect is also observable in aqueous solutions of all types which are corrosive to metals such as distilled water, tap water, boiler water, water used in automobile radiators with or without alcohols, glycols, and other freezing point depressants used in automobile radiators, hydrochloric acid solutions used for oil well acidizing and descaling of metals, aqueous brine solutions containing sodium chloride, mixed calcium chloride-magnesium chloride and similar brines used for refrigeration purposes, whether or not containing ammonia.

The class of materials, which when used in combination with the various rosin amines gives the enhanced corrosion inhibiting effect, is a polyethylene glycol ester of the general formula $$RO(CH_2CH_2O)_mH$$

wherein R is the abietoyl, hydroabietoyl, or dehydroabietoyl group. Such compounds having a molecular weight of at least 700 will have a sufficiently long polyethylene glycol chain to make the useful compounds water dispersible. The minimum value of $m$ will thus be about 10 and the maximum value about 40.

The synergistic effect will be noticeable with compositions having from 5 to 50% rosin amine or stabilized rosin amine in combination with a complementary amount of the polyethylene glycol ester but since rosin amine is not easily dispersible in water or soluble in strong mineral acids, as much as 50% of the rosin or stabilized rosin amine will ordinarily only be used in compositions for use in dilute acids such as 1 to 2% hydrochloric acid. For use in solutions of higher mineral acid concentration, particularly above about 10% concentration, or in solutions of very low or no free acid concentration, the rosin amine or stabilized rosin amine will be used in lower percentages of the composition, say, from 5 to 25%.

The amount of inhibitor composition used in aqueous solutions will ordinarily be quite low. Only sufficient to inhibit corrosion will ordinarily be used and this will vary from about 0.01% to about 5% of the aqueous solution depending upon the particular inhibitor composition. For the most active inhibitors, as may be selected from the table, the amount ordinarily used will be about 0.1% to 3% based on the weight of the aqueous solution to be inhibited.

The esters of polyethylene glycols are most readily made by condensing the rosin or stabilized rosin with ethylene oxide in the absence of water and in the presence of an alkaline catalyst such as an alkali metal salt of a resin acid until the desired amount of ethylene oxide has combined to produce a molecular weight of the product in the range of 700 to 2000. The preparation of such products is described in U. S. 2,194,429.

The rosin amines used in the compositions of this invention are the rosin amines which are prepared by reacting ammonia with a natural rosin or a modified rosin to form the nitrile from the carboxyl group in the rosin and then hydrogenating the rosin nitrile or modified rosin nitrile to form the amine. The preparation of the nitrile may be carried out by passing gaseous ammonia into the molten rosin material and vaporizing the water as fast as it is formed in order to remove the water from the reaction mixture. Dehydration catalysts may be used to facilitate the reaction with ammonia, if desired. The nitrile is preferably purified by neutralization or distillation to make it suitable for hydrogenation to the amine as the presence of acidic materials frequently destroys the hydrogenation catalyst. The nitrile may be formed from any natural rosin or modified rosin such as gum rosin, wood rosin, hydrogenated rosin, dehydrogenated or disproportionated rosin, or heat-treated rosin. The rosin nitriles may likewise be made from the rosin acids which are major constituents of these rosins such as abietic acid, dihydroabietic acid, dehydroabietic acid, and tetrahydroabietic acid.

The resin acid nitriles prepared from the natural or modified rosins or the corresponding rosin acids are readily hydrogenated to the amines. The hydrogenation is usually carried out by heating the rosin nitrile at about 150° to 200° C. with a Raney nickel catalyst under hydrogen pressure up to about 8000 lb./sq. in. The hydrogenation may also be carried out using other catalysts such as Raney cobalt, supported nickel or cobalt catalysts and noble metal catalysts such as platinum, palladium, palladium-on-carbon, or reduced platinum oxide. The reaction may be carried out under hydrogen pressure of from about 200 to 8000 lb./sq. in. and at a temperature of from about 20° C. to about 200° C. Solvents may be used if desired and are preferable at the lower temperatures. The hydrogenation may also be carried out in the presence or absence of ammonia. Although the hydrogenation is ordinarily carried out only to the extent of hydrogenation of the nitrile group which hydrogenates quite readily, the hydrogenation may also be carried out under such conditions of temperature, pressure, and time of hydrogenation as to hydrogenate the rosin amines which are produced to convert them to hydrorosin amines which correspond to the amines produced from hydrogenated rosin via the nitriles.

For convenience of expression in this specification, the abietyl, abietoyl, hydroabietyl, hydroabietoyl, dehydroabietyl, and dehydroabietoyl radicals are referred to with the intention that they be considered broadly as covering rosin materials containing those radicals as major constituents. Thus, the products derived from rosin are considered to have the abietyl or abietoyl radical as a major constituent, the products derived from hydrogenated rosin are considered to have hydroabietyl or hydroabietoyl radicals as the major constituent, and dehydrogenated rosin is considered to have dehydroabietyl or dehydroabietoyl radicals as the major constituent. Abietylamine is thus considered synonymous with rosin amine, hydroabietyl amine is considered synonymous with hydrogenated rosin amine, and dehydroabietylamine is considered synonymous with dehydrogenated rosin amine. Similarly the esters containing the abietoyl radical are considered synonymous with the natural rosin ester, those containing the hydroabietoyl radical are considered synonymous with the hydrogenated rosin esters and those containing the dehydroabietoyl radical are considered as synonymous with the dehydrogenated or disproportionated rosin esters. It is not intended, however, to exclude the possibility of minor amounts of each of the various rosin amines or polyethylene glycol esters in any of the rosin amines or polyethylene glycol esters referred to by specific chemical names.

What I claim and desire to protect by Letters Patent is:

1. A corrosion inhibitor composition for addition to aqueous solutions normally corrosive to metal surfaces consisting essentially of 5 to 50% of a primary rosin amine and a complement of a material of the formula

RO(CH₂CH₂O)ₘH having a molecular weight between about 700 and about 2000, where R is a radical selected from the group consisting of abietoyl, hydroabietoyl, and dehydroabietoyl and where $m$ is an integer such that the molecular weight is within the above-designated range.

2. A corrosion inhibitor composition for addition to aqueous solutions normally corrosive to metal surfaces consisting essentially of 5 to 50% of a dehydrogenated rosin amine and a complement of a material of the formula

RO(CH₂CH₂O)ₘH having a molecular weight between about 700 and about 2000, where R is a radical selected from the group consisting of abietoyl, hydroabietoyl, and dehydroabietoyl and where $m$ is an integer such that the molecular weight is within the above-designated range.

3. A corrosion inhibitor composition for addition to aqueous solutions normally corrosive to metal surfaces consisting essentially of 5 to 50% of a hydrogenated rosin amine and a complement of a material of the formula

RO(CH₂CH₂O)ₘH having a molecular weight between about 700 and about 2000, where R is a radical selected from the group consisting of abietoyl, hydroabietoyl, and dehydroabietoyl and where $m$ is an integer such that the molecular weight is within the above-designated range.

4. A corrosion inhibitor composition for addition to aqueous solutions normally corrosive to metal surfaces consisting essentially of 5 to 25% of a primary rosin amine and a complement of a monoester of polyethylene glycol and a rosin acid, the molecular weight of said ester being between about 700 and 2000.

5. A corrosion inhibitor composition for addition to aqueous solutions normally corrosive to metal surfaces consisting essentially of 5 to 25% of a primary dehydrogenated rosin amine and a complement of a monoester of polyethylene glycol and a rosin acid, the molecular weight of said ester being between about 700 and 2000.

6. A corrosion inhibitor composition for addition to aqueous solutions normally corrosive to metal surfaces consisting essentially of 5 to 25% of a primary hydrogenated rosin amine and a complement of a monoester of polyethylene glycol and a rosin acid, the molecular weight of said ester being between about 700 and 2000.

7. A corrosion inhibited aqueous composition comprising an aqueous solution normally corrosive toward metal surfaces selected from the group consisting of aqueous brine solutions and aqueous mineral acid solutions, said solution containing dispersed therein, in small amounts sufficient to inhibit corrosion of metal surfaces by said solution, the composition of claim 1.

8. A corrosion inhibited aqueous composition comprising an aqueous brine solution normally corrosive toward metal surfaces containing dispersed therein, in small amounts sufficient to inhibit corrosion of metal surfaces by said solution, the composition of claim 1.

9. A corrosion inhibited aqueous composition comprising an aqueous mineral acid solution normally corrosive toward metal surfaces containing dispersed therein, in small amounts sufficient to inhibit corrosion of metal surfaces by said solution, the composition of claim 1.

10. A corrosion inhibited aqueous composition comprising an aqueous mineral acid solution normally corrosive toward metal surfaces containing dispersed therein, in small amounts sufficient to inhibit corrosion of metal surfaces by said solution, the composition of claim 2.

11. A corrosion inhibited aqueous composition comprising an aqueous mineral acid solution normally corrosive toward metal surfaces containing dispersed therein, in small amounts sufficient to inhibit corrosion of metal surfaces by said solution, the composition of claim 3.

12. A corrosion inhibited aqueous composition comprising an aqueous mineral acid solution normally corrosive toward metal surfaces containing dispersed therein, in small amounts sufficient to inhibit corrosion of metal surfaces by said solution, the composition of claim 4.

13. A corrosion inhibited aqueous composition comprising an aqueous mineral acid solution normally corrosive toward metal surfaces containing dispersed therein, in small amounts sufficient to inhibit corrosion of metal surfaces by said solution, the composition of claim 5.

14. A corrosion inhibited aqueous composition comprising an aqueous mineral acid solution normally corrosive toward metal surfaces containing dispersed therein, in small amounts sufficient to inhibit corrosion of metal surfaces by said solution, the composition of claim 6.

ARTHUR L. GLASEBROOK.

REFERENCES CITED

The following references are of record in the file of this patent:

UNITED STATES PATENTS

| Number | Name | Date |
|---|---|---|
| 2,194,429 | Krzikalla | Mar. 19, 1940 |
| 2,510,063 | Bried | June 6, 1950 |